UNITED STATES PATENT OFFICE.

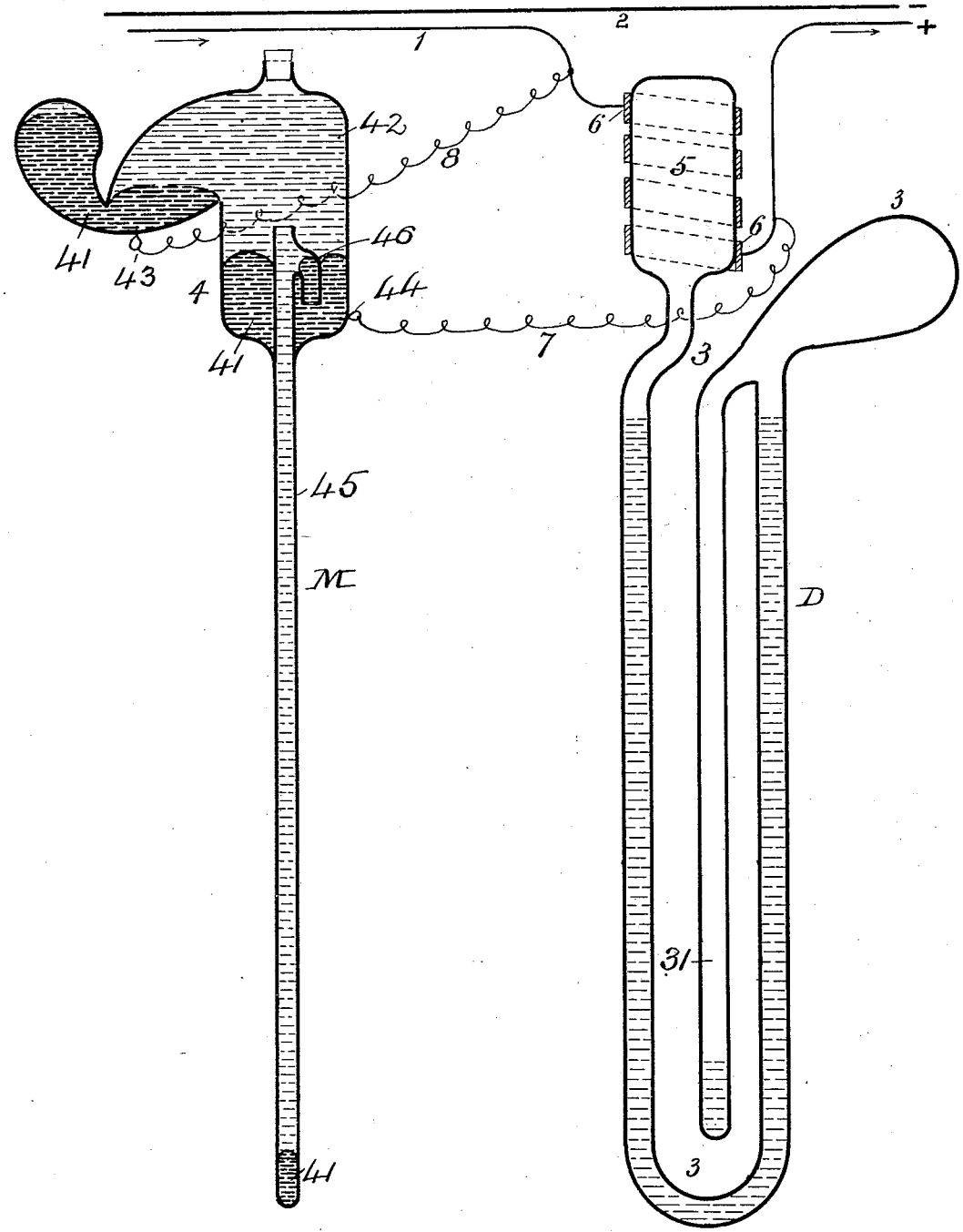

ARTHUR WRIGHT, OF BRIGHTON, ENGLAND, ASSIGNOR TO THE MUTUAL ELECTRIC TRUST, LIMITED, OF BRIGHTON, ENGLAND.

METERING OF ELECTRICITY.

SPECIFICATION forming part of Letters Patent No. 702,847, dated June 17, 1902.

Application filed June 26, 1900. Serial No. 21,639. (No model.)

*To all whom it may concern:*

Be it known that I, ARTHUR WRIGHT, a subject of the Queen of Great Britain, and a resident of Brighton, in the county of Sussex, England, have invented certain new and useful Improvements in the Metering of Electricity, of which the following is a specification.

My invention relates to electric metering, and by means of it certain advantages are obtained.

In the metering of electricity it is now a common practice to employ not only an electricity-meter as usually understood—such, for example, as a current or energy meter—
but also in order that the charges may be determined in a more equitable manner another instrument—such, for example, as a demand-indicator. A disadvantage which results from this practice is that as each instrument entails a drop in volts a double drop is thus involved. By means of my invention, however, I am able to employ both instruments with no further loss than is entailed by a single instrument.

In order that the nature of my invention may be more readily understood, I have appended hereto a drawing illustrating the application of my invention to the case in which both a Wright demand-indicator and a Wright meter of the mercury electrolytic type are employed.

In the drawing, D represents a suitable type of a demand-indicator—that is to say, an indicator for recording an extreme limit or range of a variable characteristic of an electric current within a certain period of time, or, more specifically stated, an indicator which will record the maximum or minimum current which has passed during any given period of time. The demand-indicator D, as shown, is like that of Fig. 7 of my prior patent, No. 583,160, dated May 25, 1897.

The heating-strip 6 of the demand-indicator is wrapped around the bulb 5 in any well-known manner. The passage of the current through the heating resistance causes expansion of the gas in the chamber 5, and thus forces the liquid in the U-tube 3 to the top of the limb of the tube removed from the chamber 5 and causes its overflow into the receptacle 31, which may be calibrated. It is evident that the amount of liquid in the receptacle 31 may be taken to measure the maximum amount of current which has passed through the heating-coil 6 since the instrument has been reset and the receptacle 31 has been emptied, all as fully explained in my prior patent.

The electricity-meter M, as shown, is of the mercury electrolytic type and is fully described in my application No. 18,124, filed May 26, 1900, although any form of electricity-meter might be adopted. As shown, it consists of a glass receptacle closed at all points and filled in part with a mass of mercury 41 and in part with an electrolyte 42. The anode 43 and the cathode 44 communicate with the masses of mercury, as shown. Upon passage of the current the volume of mercury at the anode decreases and at the cathode increases. Some of the mercury at the cathode representing the increase in volume is fed through the small or intermediate chamber 46 and falls in small globules into the cylinder 45, which may be calibrated. The amount of mercury in this cylinder may be taken as a measure of the amount of current which has passed through the indicator.

The manner of connecting the demand-meter D and the electricity-meter M to the mains is shown in the drawings. The supply-leads are numbered 1 and 2, and the heating-coil 6 of the demand-indicator is placed in circuit therewith. The electricity-meter M is connected by the wires 7 and 8 in shunt to the demand-indicator. As shown, it is connected in shunt to the heating resistances of this demand-indicator.

I desire it to be understood that my invention is not limited to the type of demand-indicator specifically shown and described herein. I may employ any form of such indicator, among them the forms shown in my prior Patent No. 583,160. Thus instead of the heating-strip 6 I may employ, for example, a coil or part of a coil of an electromagnetic form of instrument, or, say, a thermostatic band or part thereof, or an expansion-wire as used in certain thermal types of instruments. Similarly instead of the mercury electrolytic type of meter 4 I may employ any other convenient form of electricity-meter.

While I have shown a specific form of demand-indicator and a specific form of electricity-meter, I repeat that any form of demand-indicator and any form of electricity-meter may be used in carrying out my invention, which consists, broadly, in connecting an electricity-meter in shunt to a demand-indicator, so that the resistance of the demand-indicator or part of it forms the shunting resistance for the electricity-meter.

Having thus described my invention, what I claim as new, and desire to secure by Letters Patent, is—

1. The combination of a demand-indicator and an electricity-meter in shunt thereof, substantially as described.

2. The combination of a demand-indicator and an electricity-meter in shunt thereof, the resistance or the demand-indicator, or part of it, serving as the shunting resistance for the electricity-meter, substantially as described.

3. The combination of a thermal demand-indicator and an electricity-meter in shunt thereof, the heating resistance of the demand-indicator, or part of it, serving as a shunting resistance for the electricity-meter, substantially as described.

4. The combination of a demand-indicator and an electrolytic meter in shunt thereof, the resistance of the demand-indicator or part of it, serving as the shunting resistance for the electrolytic meter, substantially as described.

In witness whereof I have hereunto set my hand in presence of two witnesses.

ARTHUR WRIGHT.

Witnesses:
JOHN REID DICK,
JAMES G. LORRAIN.